United States Patent
Chen

(10) Patent No.: US 6,817,145 B2
(45) Date of Patent: Nov. 16, 2004

(54) GLASSHOUSE STRUT

(76) Inventor: Chung-Teng Chen, 1F, No. 1-1, Wang Tzu Street, Chung-Li City, Tayuang County (TW)

(*) Notice: Subject to any disclaimer, the term of this patent is extended or adjusted under 35 U.S.C. 154(b) by 0 days.

(21) Appl. No.: 10/228,941

(22) Filed: Aug. 28, 2002

(65) Prior Publication Data

US 2004/0040226 A1 Mar. 4, 2004

(51) Int. Cl.[7] .............................................. E04G 25/00
(52) U.S. Cl. ............... 52/127.2; 52/DIG. 1; 248/206.3; 248/363; 294/64.1; 294/65; 269/55
(58) Field of Search .......................... 52/127.2, DIG. 1; 248/206.3, 363; 269/55; 294/64.1, 65

(56) References Cited

U.S. PATENT DOCUMENTS

| | | | |
|---|---|---|---|
| 2,722,448 A | * | 11/1955 | Popp et al. |
| 3,982,782 A | * | 9/1976 | Bos |
| 4,932,701 A | * | 6/1990 | Cornillier et al. |
| 5,237,459 A | * | 8/1993 | Strauss |
| 5,297,710 A | * | 3/1994 | Juras |
| 5,975,183 A | * | 11/1999 | Reis et al. |
| 6,311,966 B1 | * | 11/2001 | Morishita et al. |

\* cited by examiner

*Primary Examiner*—Robert Canfield
(74) *Attorney, Agent, or Firm*—Troxell Law Office PLLC

(57) ABSTRACT

A strut used to support various specifications of glasshouse construction including a plurality of arms articulated to a fixture disk to support abutted glass blocks. Each arm includes a primary rod, an extended rod and a suction base to allow adjustment of angles of the arm for adjusting the angles, and additional extended rod may be articulated for extra length of the arm to cope with individual construction of the glasshouse.

5 Claims, 4 Drawing Sheets

GLASSHOUSE STRUT

BACKGROUND OF THE INVENTION (a) Field of the Invention

The present invention is related to an articulated strut to support glass blocks in the construction of a glasshouse, and more particularly, to one that allows adjustment of angles and connection of additional sections depending on the requirements of angle and distance between abutted glass blocks to facilitate mounting of glass blocks and expand range of application of the strut while significantly reducing the production cost otherwise incurred in the manufacturing of struts in various specifications.

(b) Description of the Prior Art

Glass blocks to be used for the construction of a glasshouse are usually provided in a given size and specification, mounted in sequence respectively at a certain location, then glass strips are provided at where glass blocks are abutted to each other, finally a strut is provided between abutted glass sheets. Once the glass strips are sufficient to support the glass blocks, the strut is removed for next job. However, the form and specification of the glasshouse vary, and so do the angle and position of each glass sheet depending on the individual structure of a glasshouse. Consequently, different forms and specifications of struts have to be prepared to cope with the constructional needs of a glasshouse. The strut of the prior art relates to a fixture provided with a fixed arm each at its four corners, a suction is each attached to the distal end of the arm. The problem is that the reach of the arm and the angle of the suction are both fixed making the strut not applicable to a smaller glasshouse or a glasshouse provided with a dome. In such case, preparation of struts in various forms and specifications resulting in increased constructional cost of the glasshouse. Furthermore, the constructional schedule is always delayed due to that in the course of construction, more time are consumed in the selection and confirmation of the right strut to be used, meaning many man-hours and work processes are required.

SUMMARY OF THE INVENTION

The primary purpose of the present invention is to provide an improved structure of a strut to facilitate the construction and improves its range of applicability for the construction of a glasshouse. To achieve the purpose, an articulated strut comprised of multiple arms each extending from a fixture a primary rod and one or more than one extended rod to allow adjustment of angles among the primary rod, suction and extended rod is used, so that each arm of the strut is able to change its angle as demanded by abutted glass blocks in the course of the construction of a glasshouse.

Another purpose of the present invention is to provide an improved structure of a strut that allows adjustment of the angle between abutted arms of the strut as required in the filed application. To achieve the purpose, a swing for a proper angle is permitted while a shaft rod from the fixture is coupled into a hole in the primary rod before being locked in place by means of a bolt.

DETAILED DESCRIPTION OF THE PREFERRED EMBODIMENTS

Figure 1:
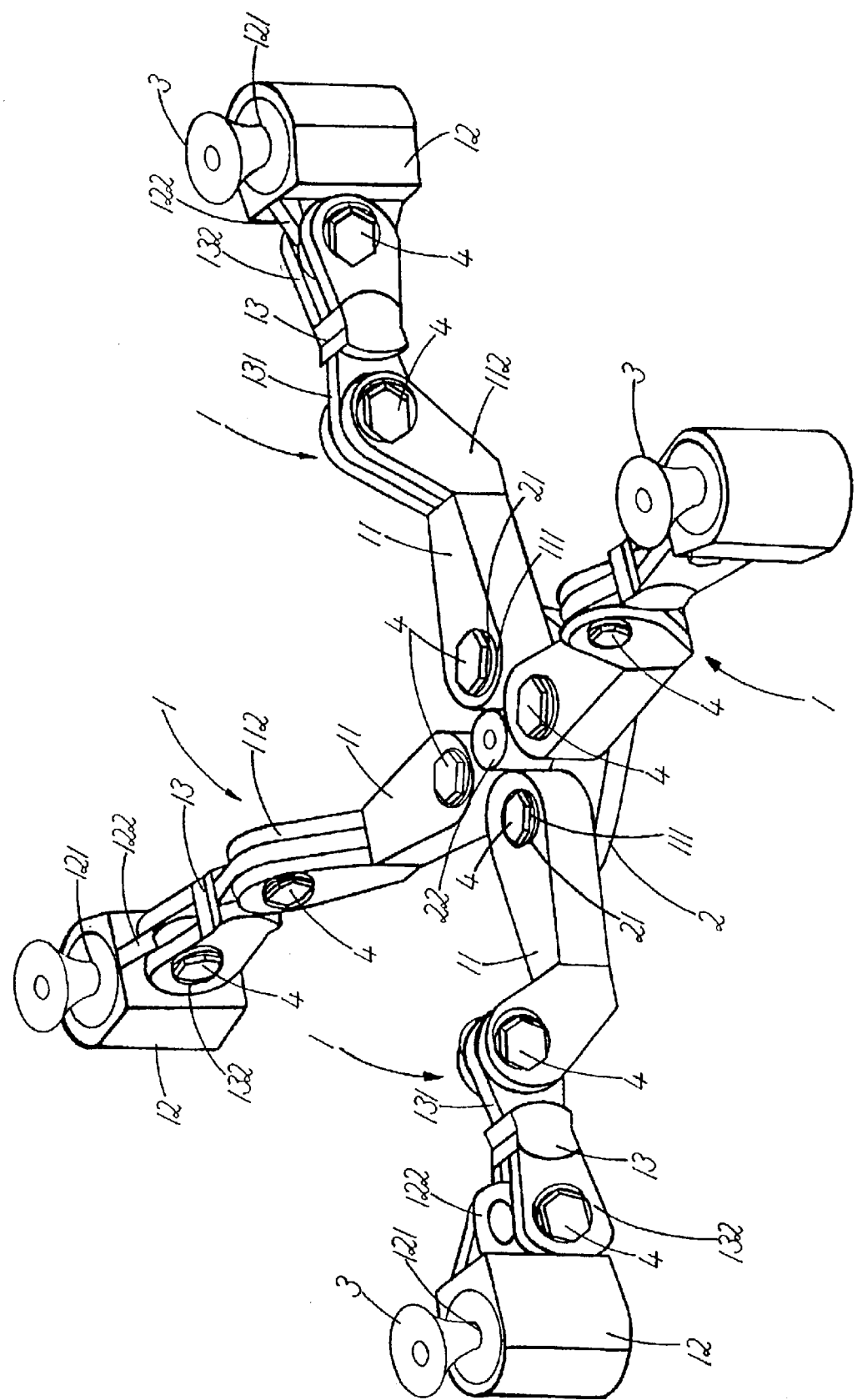
FIG. 1 is a view showing the appearance of a preferred embodiment of the present invention.
Figure 4:
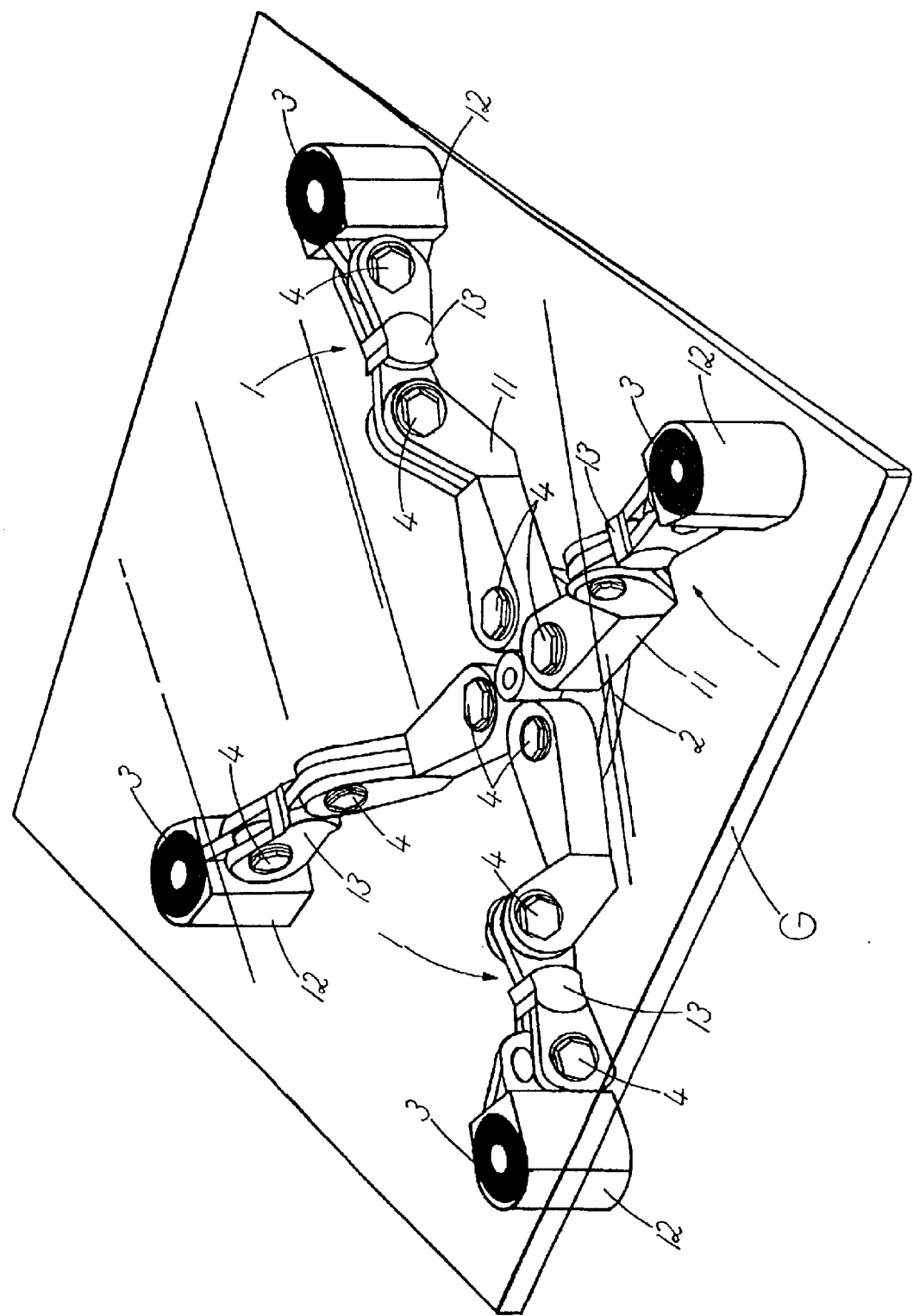
FIG. 4 is a schematic view showing that the preferred embodiment of the present invention is in use.

Referring to FIGS. 1 and 4, a strut of a preferred embodiment of the present invention is comprised of multiple arms (1) articulated to fixture (2) to support abutted glass blocks (G). Wherein, the fixture (2) is a disk shape and has a plurality of shaft rods (21) with a hole (22) in a top surface. The multiple arms (1) are connected to a suction (3).

Figure 2:
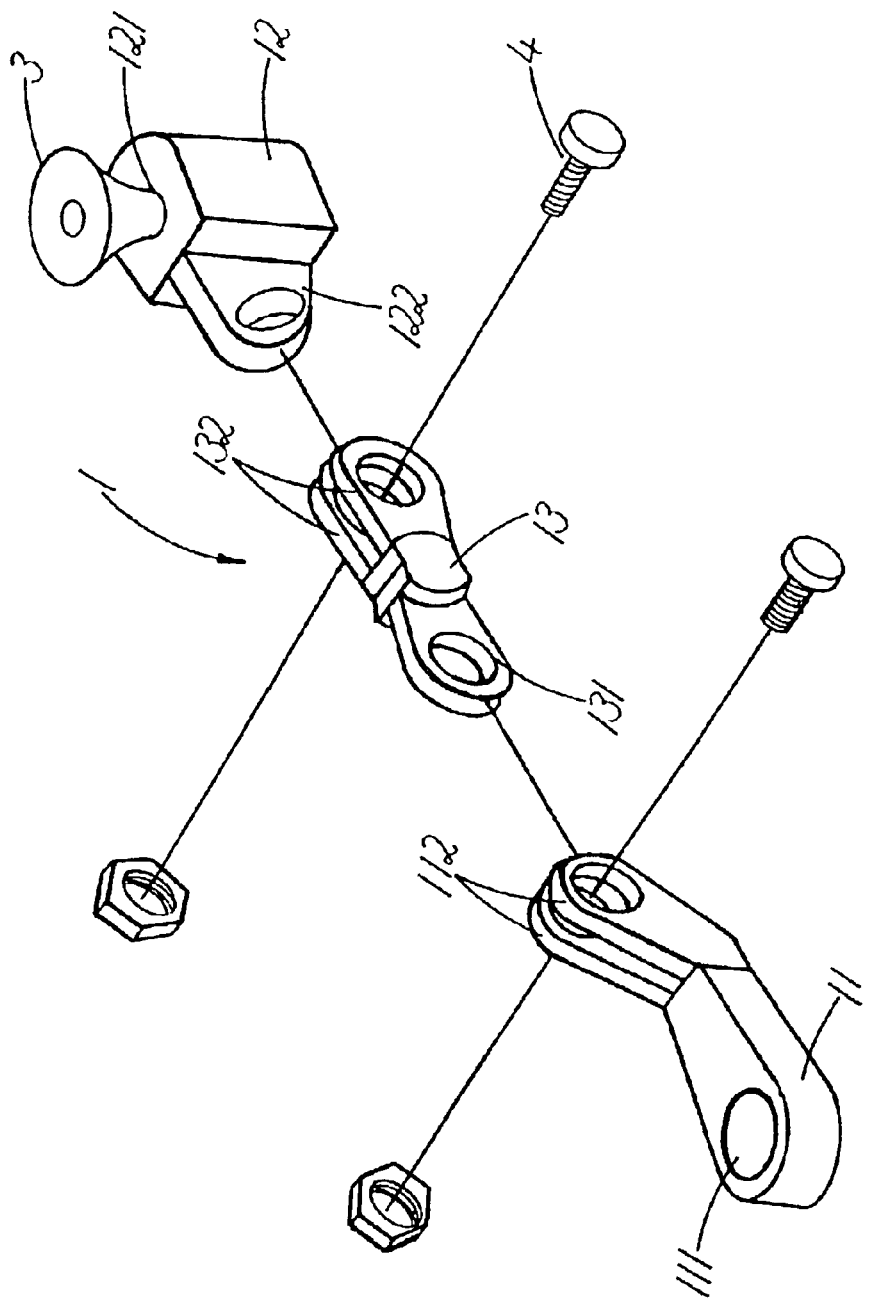
FIG. 2 is an exploded view of multiple arms of the preferred embodiment of the present invention.

As illustrated in FIG. 2, wherein, each arm (1) is comprised of a primary rod (11), an extended rod (13) and a suction base (12) articulated among them. The suction base (12) relates to a block structure, provided with an insertion hole (121) to receive a suction (3) to attach to the glass block. A pivoting ear (122) is formed on the inner side of the suction base (12) and both ends of the extended rod (13) of each arm are respectively formed with a male pivoting ear (131) and a female pivoting ear (132) to be articulated with the suction base (12) and a primary rod (11) of the arm (1).

Figure 3:
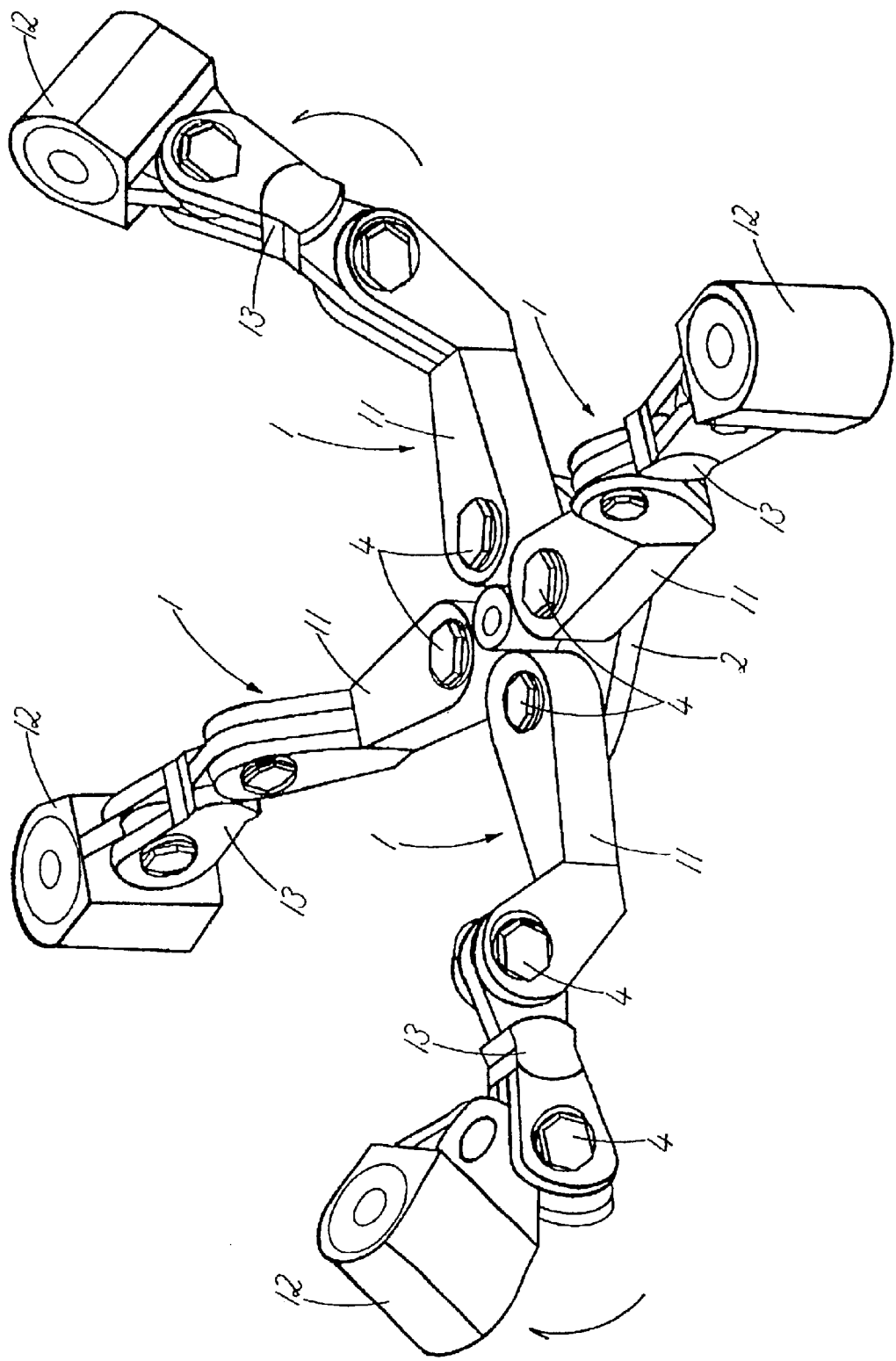
FIG. 3 is a schematic view showing change of angle between a primary rod and a suction of the preferred embodiment of the present invention.

A hole (111) is provided in the primary rod (11) at one end to be articulated with the shaft rod (21) from the fixture (2) while at the other end a female pivoting ear (112) is provided to be articulated with the male pivoting ear (131) of the extended rod (13) or the male pivoting ear (122) from the suction base (12). Once the primary rod (11) has its female pivoting ear (112) to be articulated with the male pivoting ear (131) from the extended rod (13), a bolt (4) is used to penetrated through both of the female pivoting ear (112) and the male pivoting ear (131) to lock the primary rod (11) and the extended rod (13), then similarly, another bolt (4) is used to penetrate through and lock up both of the female pivoting ear (132) of the extended rod (13) and the male pivoting ear (122) of the suction base (12) to form a complete arm (1). As illustrated in FIG. 3, the articulated arm (1) allows angle adjustment among the primary rod (11), the extended rod (13) and the suction base (12) to change the angle of the arm (1) as required. Meanwhile, each arm (1) also permits a swing for a proper angle when articulated with the shaft rod (21) from the fixture (2) and the hole (111) in the primary rod (11) before being locked up with the bolt (4) for adjusting the angle between abutted arms (1) to cope with the constructional work requirements.

Furthermore, the female pivoting ear (112) of the primary rod (11) is disposed at a certain inclination in relation to the primary rod (11) to allow more changes available for the arm (1) in general. While the length of the extended rod (13) may be that as desired, additional extended rod (13) may be pivoted and locked to the existing extended rod (13) for the length as desired.

However, accompanying drawings and the specification disclosed do not restrict the scope of the present invention. It is to be noted that any alternation made pursuant to the specification disclosed above, the structural characteristics and function shall fall within the teaching of the present invention.

The present invention by allowing adjustment for proper angles among the primary rod, the extended rod and the suction base, and connection of additional extended rod for the length as desired meets the support requirements of angle and distance between abutted glass blocks in the construction of a glasshouse so to improve convenience and applicability of the strut, to significantly reduce costs resulted from production of struts in various specifications, and to shorten the constructional schedule.

I claim:

1. A strut for construction of a glasshouse comprising:
   a) a disc-shaped fixture having a plurality of shaft rods extending upwardly from a top of the fixture; and
   b) a plurality of arms, each of the plurality of arms having:
      i) a primary rod pivotally connected at a first primary rod end to one of the plurality of shaft rods;
      ii) at least one extension, rod pivotally connected at a first extension rod end to a second primary rod end of the primary rod; and
      iii) a suction base having a first suction base end pivotally connected to a second extension rod end of the at least one extension rod, wherein the primary rod has a V-shape.

2. The strut according to claim 1, further comprising a plurality of suction elements, one suction element connected to each suction base of each of the plurality of arms.

3. The strut according to claim 1, further comprising a hole through the first primary rod end through which one of the plurality of shaft rods is inserted.

4. The strut according to claim 1, further comprising a female pivoting ear on the second primary rod end, and a male extension rod on the first extension rod end pivotally connected to the first female pivoting ear.

5. The strut according to claim 1, further comprising a female pivoting ear located on the second extension rod end, and a male pivoting ear located on the first suction base end pivotally connected to the second female pivoting ear.

* * * * *